US012278424B2

(12) United States Patent
Jan et al.

(10) Patent No.: US 12,278,424 B2
(45) Date of Patent: Apr. 15, 2025

(54) EXTERNAL ANTENNA FOR PORTABLE COMMUNICATION DEVICE

(71) Applicant: MOTOROLA SOLUTIONS, INC., Chicago, IL (US)

(72) Inventors: Peter Christopher Jan, Penang (MY); Stephen D. Hunt, Cooper City, FL (US); Lee Huang Ng, Penang (MY); Alexander Oon, Penang (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 119 days.

(21) Appl. No.: 18/063,226

(22) Filed: Dec. 8, 2022

(65) Prior Publication Data

US 2024/0195055 A1 Jun. 13, 2024

(51) Int. Cl.
*H01Q 1/40* (2006.01)
*H01Q 1/24* (2006.01)
*H01Q 9/32* (2006.01)

(52) U.S. Cl.
CPC ............... *H01Q 1/40* (2013.01); *H01Q 1/242* (2013.01); *H01Q 9/32* (2013.01)

(58) Field of Classification Search
None
See application file for complete search history.

(56) References Cited

U.S. PATENT DOCUMENTS 836,072 A 11/1906 Forest
4,205,319 A 5/1980 Gasparaitis et al.
4,435,713 A 3/1984 Gasparaitis et al.
5,108,819 A * 4/1992 Heller .................. H01L 23/145 428/209
5,856,807 A 1/1999 Davis et al.
5,914,689 A 6/1999 Cockson
6,052,097 A * 4/2000 Duncan ................. H01Q 1/273 343/788

(Continued)

FOREIGN PATENT DOCUMENTS

| | | |
|---|---|---|
| CN | 204742950 U | 11/2015 |
| RU | 59329 U1 | 12/2006 |
| WO | 97050146 A1 | 12/1997 |

OTHER PUBLICATIONS

International Search Report and Written Opinion for Application No. PCT/US2023/080349 dated Mar. 26, 2024 (13 pages).

(Continued)

*Primary Examiner* — Wilson Lee
(74) *Attorney, Agent, or Firm* — Michael Best & Friedrich LLP

(57) ABSTRACT

A method of constructing an antenna of a portable communication device. The method includes wrapping a conductive element around a flexible support, coupling the conductive element and the flexible support to a rigid connector to assemble an antenna core, and coating the antenna core with a room temperature vulcanizing (RTV) silicone layer. The method further includes fitting a first half of a silicone rubber sheath and a second half of a silicone rubber sheath around the antenna core, compression molding the first half of the silicone rubber sheath and the second half of the silicone rubber sheath around the antenna core, and bonding, by the RTV silicone layer, the silicone rubber sheath to the antenna core.

9 Claims, 11 Drawing Sheets

(56) References Cited

U.S. PATENT DOCUMENTS

| | | | | |
|---|---|---|---|---|
| 6,061,037 | A * | 5/2000 | Brouwers .............. | H01Q 1/273<br>343/900 |
| 7,525,505 | B2 | 4/2009 | Cislo | |
| 10,992,036 | B2 | 4/2021 | Jan et al. | |
| 2005/0070376 | A1 * | 3/2005 | Savarese ................ | A63B 43/00<br>473/353 |
| 2006/0164250 | A1 * | 7/2006 | Kawai .............. | G06K 19/07764<br>340/447 |
| 2010/0032066 | A1 * | 2/2010 | Nakao ..................... | B60C 13/00<br>235/492 |
| 2016/0125870 | A1 * | 5/2016 | Calvo .................... | G10K 11/30<br>367/138 |
| 2017/0237167 | A1 | 8/2017 | Ohno et al. | |
| 2017/0288456 | A1 * | 10/2017 | Chan .................... | H05K 1/0201 |
| 2019/0379131 | A1 * | 12/2019 | Nguyen ............. | H01Q 21/0025 |
| 2021/0021026 | A1 | 1/2021 | Jan et al. | |

OTHER PUBLICATIONS

Kutz, M. (Ed.), “Applied Plastics Engineering Handbook: Processing and Materials,” Chapter 6 “Thermoplastic Elastomers,” Elsevier Science & Technology Books, 2011, pp. 77-91.

* cited by examiner

EXTERNAL ANTENNA FOR PORTABLE COMMUNICATION DEVICE

BACKGROUND OF THE INVENTION

The disclosure relates to an external antenna for a portable communication device, such as a land-mobile radio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features that include the claimed subject matter, and explain various principles and advantages of those embodiments, examples, aspects, and features.

Figure 1:
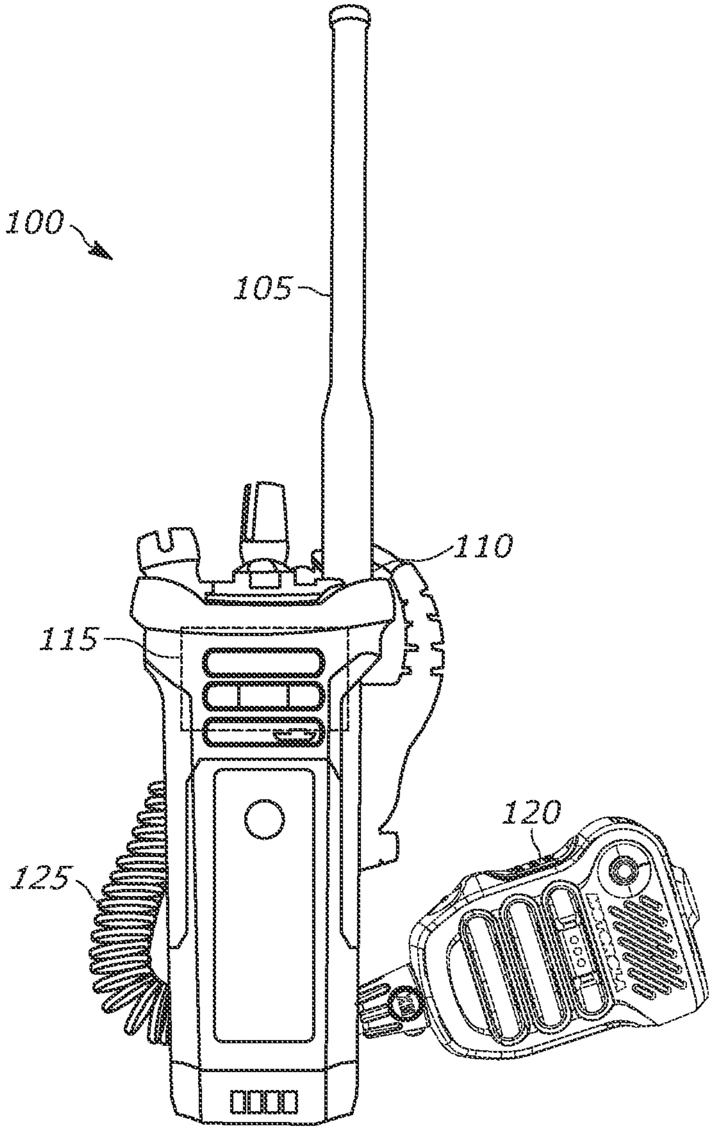
FIG. 1 is a perspective view of a portable communication device in accordance with some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding various embodiments, examples, aspects, and features so as not to obscure the disclosure with details that will be readily apparent to those of ordinary skill in the art having the benefit of the description herein.

DETAILED DESCRIPTION OF THE INVENTION

Portable communication devices (for example, land-mobile radios (LMRs)) are used by first responders (police, fire, and medical personnel) and others. The devices are frequently exposed to sun, water, dirt, wind, rain, snow, temperature extremes and other environmental conditions and to various physical stresses (for example, being dropped, jarred, and the like). Environmental conditions and physical stresses may cause damage to one or more components of the portable communication device. For example, a device antenna can be damaged. A device with a damaged antenna may operate poorly or become inoperable. Accordingly, portable communication devices intended for use by first responders are designed to satisfy various safety standards that ensure reliable operation of the portable communication device. For example, the National Fire Protection Association (NFPA) requires that the antenna included in a portable communication device used by a fireman be operable to withstand various stress tests including a drop test, a heat test, a heat and immersion test, a direct flame test, and a tumble test.

Existing antenna designs for portable communication devices used by first responders sometimes fail to meet the above-described stress testing requirements of the NFPA. In addition, existing antenna designs for portable communication devices used by first responders are sometimes constructed from rigid materials. Rigid materials may become damaged and worn after repeated use. Accordingly, a flexible and durable external antenna design that is capable of withstanding the various stress test requirements of the NFPA is desired.

One aspect provides an antenna for a portable communication device. The antenna includes an antenna core including a conductive antenna element coupled to a flexible support and a rigid connector coupled to the conductive antenna element and the flexible support. The antenna further includes a silicone rubber sheath that surrounds the antenna core and a room temperature vulcanizing (RTV) silicone layer positioned between the antenna core and the sheath, the RTV silicone layer bonding the antenna core to the sheath.

Another aspect provides a method of constructing an antenna of a portable communication device. The method includes wrapping a conductive element around a flexible support, coupling the conductive element and the flexible support to a rigid connector to assemble an antenna core, and coating the antenna core with a room temperature vulcanizing (RTV) silicone layer. The method further includes fitting a first half of a silicone rubber sheath and a second half of a silicone rubber sheath around the antenna core, compression molding the first half of the silicone rubber sheath and the second half of the silicone rubber sheath around the antenna core, and bonding, by the RTV silicone layer, the silicone rubber sheath to the antenna core.

FIG. 1 is a perspective view of an example communication device 100, which may hereinafter be interchangeably referred to as the device 100. In the example shown the communication device 100 includes features useful to first responders and is otherwise configured for use in the environmental conditions often encountered by first responders. In the example of FIG. 1, the device 100 is a land-mobile radio (LMR) that includes an external antenna. However, the device 100 may be configured to communicate using other communication protocols and does not need to be configured for use by first responders.

The device 100 includes, among other things, an antenna 105, an antenna receptacle 110, and a radio transceiver 115. In some instances, the antenna 105 is removably coupled to the device 100 via the antenna receptacle 110. For example, in some instances, the antenna 105 is removably coupled to the device 100, via the antenna receptacle 110, using a twisting motion to remove and attach the antenna 105. In other instances, the antenna 105 is removably coupled to the device 100 using a different attachment mechanism and/or corresponding motion. In some instances, the antenna 105 is permanently coupled to the device 100 by the antenna receptacle 110.

The radio transceiver 115 is illustrated with dotted lines to indicate that the radio transceiver 115 is internal to the device 100. The radio transceiver 115 is connected to the antenna 105 via the antenna receptacle 110, thereby enabling the radio transceiver 115 to wirelessly communicate via an antenna element included in the antenna 105. In some instances, the radio transceiver 115 includes one or more of a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (for example, 802.11a, 802.11b, 802.11g), an LTE (Long-Term Evolution) transceiver and/or other types of GSM (Global System for Mobile communications) transceivers, a Worldwide Interoperability for Microwave Access (WiMAX) transceiver, for example operating in accordance with an IEEE 802.16 standard, and/or another similar type of wireless transceiver configurable to communicate via a wireless radio network.

While not depicted, the device 100 may include an electronic processor and a memory (for example, a computer-readable storage medium). The electronic processor implements the instructions stored in the memory to control operation of the radio transceiver 115. For example, the electronic processor controls the frequency range at which the radio transceiver 115 operates. In some instances, the antenna 105 includes a multiband antenna configured to operate over a plurality of bands. In such instances, the processor may control the frequency range at which the radio transceiver 115 operates based on one or more inputs. In other instances, the antenna 105 is one of a plurality of antennas that are removably attachable to the device 100, and each of the plurality of antennas is configured to operate at different (or the same) frequency bands. In some instance, frequencies in a range of about 100 MHz to about 900 MHz are used. In such instances, the processor controls the frequency range at which the radio transceiver 115 operates based on the operating frequency of the antenna 105 that is coupled to the device 100.

In the illustrated example, the device 100 also includes an accessory device, for example, a microphone, 120 that is connected to the device 100 by a cable 125. In other instances, the device 100 includes one or more additional accessory devices that are not microphones. In other instances, the device 100 does not include an accessory device.

Figure 2:
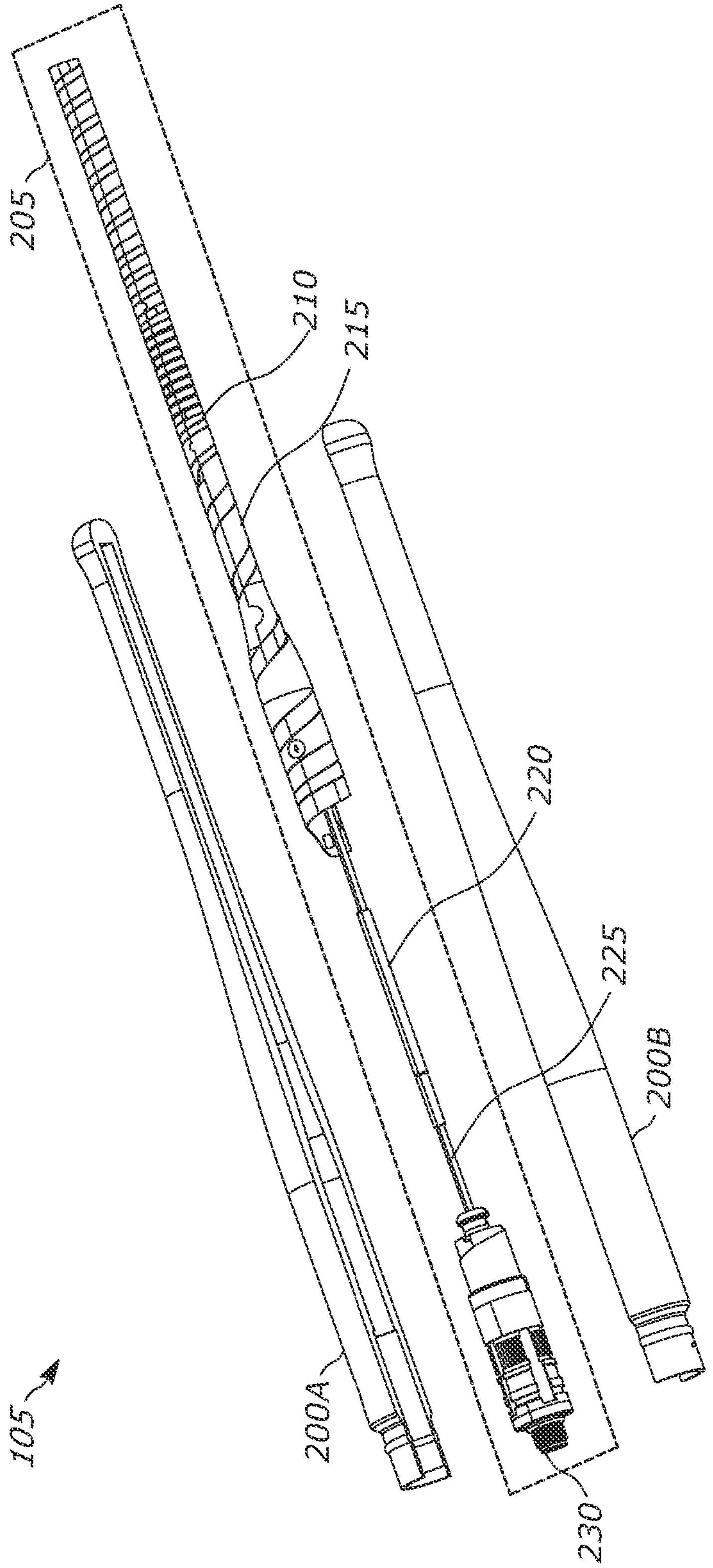
FIG. 2 is an exploded view of an antenna included in the portable communication device of FIG. 1 in accordance with some aspects.

FIG. 2 illustrates an exploded view of the antenna 105. In the example shown, the antenna 105 includes an external sheath 200 and an antenna core 205. As will be described in more detail below, the external sheath 200 includes first and second halves 200A, 200B that are compression molded around the antenna core 205 during construction of the antenna 105. The external sheath 200 is formed of a flexible silicone rubber material that is rated to withstand the various stress tests imposed by the NFPA. For example, the silicone rubber material used to form the external sheath 200 is a heat cured, or solid silicone, rubber. One non-limiting example of a particular silicone rubber used to form the external sheath 200 is KE-581U manufactured by Shin-Etsu Chemical Co.™. The silicone rubber material used to form the external sheath 200 has good heat resistance properties and a low dielectric loss component. Accordingly, the external sheath 200 is preferably rated to withstand the high temperature requirements (for example, 500-2100° Fahrenheit) of the NFPA and shields the signals transmitted and received by the antenna 105 from electromagnetic interference.

The antenna core 205 includes an antenna conductor 210, a flexible support 215, a floating antenna element 220, a spacer 225, and a connector assembly 230. In the example shown, the antenna conductor 210 is a helical coil that is wrapped around the flexible support 215. However, in some instances, the antenna conductor 210 is not wrapped around the flexible support 215 and is coupled to the flexible support 215 in a different manner. For example, in some instances, the antenna conductor 210 is implemented as one or more of a straight antenna element, a monopole antenna element, a folded monopole antenna element, and/or a combination of a straight antenna element and a helical antenna element. The antenna conductor 210 is formed of one or more flexible conductive materials, for example, copper, brass, bronze, and/or aluminum. In some instances, the conductor 210 is a flexible printed circuit board. For example, in such instances, the conductor 210 includes a copper inner layer and a polyamide outer layer.

The flexible support 215 is formed of one or more flexible materials, for example, polyamide, liquid silicone rubber, compression silicone rubber, ethylene propylene diene monomer (EPDM) rubber, and/or glass-filled nylon. In some instances, one or more additional silicone materials are used to form the flexible support Similar to the silicone rubber material used to form the external sheath 200, the flexible materials used to form the flexible support 215 are preferably rated to withstand the high temperature requirements (for example, 500-2100° Fahrenheit).

When the antenna core 205 is assembled, the floating antenna element 220 is inserted into the flexible support 215 and spaced apart from the connector assembly 230 by the spacer 225. For example, the flexible support 215 includes an internal channel along its longitudinal axis into which the floating antenna element 220 is inserted. While inserted in the flexible support 215, the floating antenna element 220 is not in galvanic electrical connection to other electrical components of the antenna 105. However, the floating antenna element may be capacitively connected to other electrical components of the antenna 105, for example, the antenna conductor 210. In some instances, the floating antenna element 220 is implemented as a monopole antenna element and/or a folded monopole antenna element. The spacer 225 supports the floating antenna element 220 while the floating antenna element 220 is inserted in the flexible support 215. The spacer 225 is formed of an insulating material and/or a dielectric material, for example, Teflon™ material. In some instances, the antenna core 205 does not include the floating antenna element 220.

The connector assembly 230 is used to couple the antenna 105, via the antenna receptacle 110, to the device 100. Moreover, the connector assembly 230 electrically connects the antenna 105 to the radio transceiver 115. For example, the connector assembly 230 includes one or more electrical connectors and/or signal pins that electrically connect the antenna conductor 210 and/or the floating antenna element 220 to the radio transceiver 115. In some instances, the connector assembly 230 does not include any internal circuitry, for example, matching circuitry. In other instances, the connector assembly 230 includes one or more matching circuits.

Figure 3:
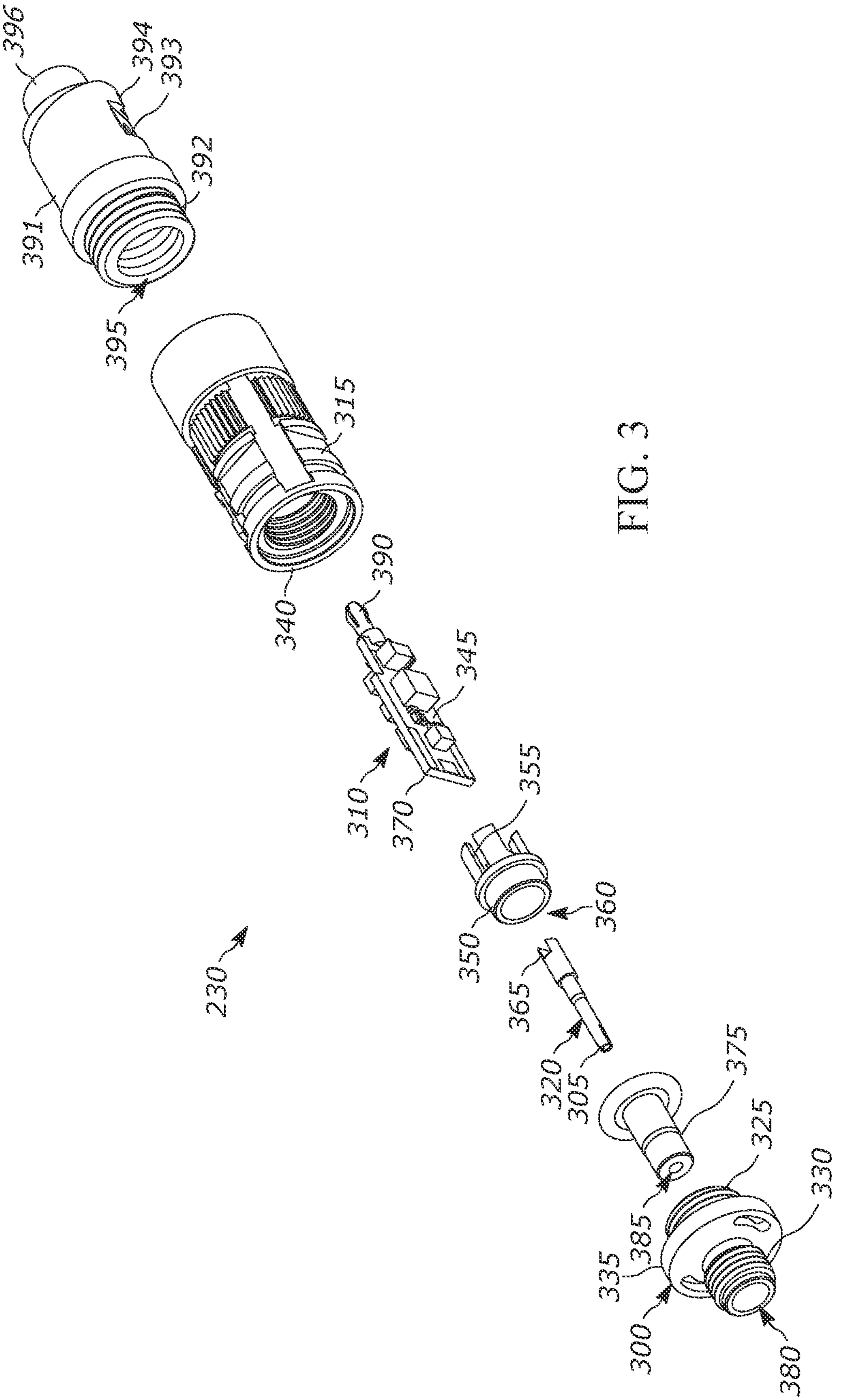
FIG. 3 is an exploded view of a connector assembly included in the antenna of FIG. 2 in accordance with some aspects.

FIG. 3 illustrates an exploded view of the connector assembly 230, according to one example. The connector assembly 230 includes, among other things, a base 300, an electrical connector 305, a matching circuit 310 that is removably positioned between the electrical connector 305 and the antenna conductor 210 when the antenna core 205 is assembled, and a shell 315 that is removably attached to the base 300 and arranged to surround and protect the matching circuit 310. When the antenna core 205 is assembled, the electrical connector 305 is electrically connected to the antenna conductor 210 and/or the floating antenna element via the matching circuit 310. In some instances, the electrical connector is integrated with and/or includes a signal pin 320.

As shown, the base 300 includes first threads 325 that extend towards the matching circuit 310 (and/or extend internally into the antenna 105), and second threads 330 that extend away from the matching circuit 310. The threads 325, 330 are separated on the base 300 by a circular lip and/or ledge 335. In some instances, the base 300 including the threads 325, 330 and the circular lip and/or ledge 335 is formed from metal as an integrated unit. The shell 315 includes complementary threads 340 that removably mate with the first threads 325 of the base 300. Accordingly, during assembly of the connector assembly 230, the shell 315 is screwed onto the base 300 via the threads 325, 340, and resides against the internal side of the circular ledge 335.

The second threads 330 are arranged to mate with the antenna receptacle 110 (for example, at complementary threads of the antenna receptacle 110). Accordingly, during attachment of the antenna 105 to the communication device 100, the antenna 105 is screwed into the antenna receptacle 110 via the threads 330 (and complementary threads at the antenna receptacle 110). The antenna receptacle 110 resides against an external side of the circular ledge 335 when attached to the device 100.

The base 300 and the shell 315 are formed of one or more conductive metals. Accordingly, the shell 315 is electrically connected to the antenna receptacle 110 when the antenna 105 is attached to the device 100. The shell 315 is electrically isolated from the antenna conductor 210, the electrical connector 305, and the matching circuit 310. Furthermore, the shell 315 is rigid and surrounds the matching circuit 310 to mechanically protect the matching circuit 310. In some instances, the shell 315 grounds the antenna conductor 210 and/or the matching circuit 310 when the connector assembly 230 is coupled to the device 100. In some instances, an additional grounded antenna element connected to the shell 315 may be wrapped around the flexible support 215, for example, in a double helix arrangement with the depicted helical antenna conductor 210 (for example, the grounded antenna also being helical, and electrically isolated from the helical antenna conductor 210).

The matching circuit 310 includes a printed circuit board (PCB) 345 upon which radio-frequency (RF) matching electrical components of the matching circuit 310 are mounted. As the antenna conductor 210 may be capable of operating over a plurality of bands, when the antenna 105 is attached to the device 100, the radio transceiver 115 wirelessly, via the antenna conductor 210 and the matching circuit 310, over a plurality of bands. Accordingly, the matching circuit 310 is configured to perform radio-frequency (RF) matching between the radio transceiver 115 and the antenna conductor 210 over the plurality of bands. The shell 315 surrounds the matching circuit 310 and PCB 345 to physically protect the matching circuit 310 and PCB 345 from damage during stress tests, for example a fall test or a tumble test, of the antenna 105 and/or the device 100.

The connector assembly 230 also includes a receptacle 350 for removably receiving the PCB 345. The receptacle 350 includes one or more slots 355 (as depicted at least two slots 355) into which the PCB 345 is removably received. The receptacle 350 also includes an aperture 360 through which the signal pin 320 extends. As shown, the signal pin 320 is configured to removably mate with the matching circuit 310 when the PCB 345 is received at the receptacle 350 (for example, in slots 355). The signal pin 320 includes a respective slot 365 which extends into the receptacle 350, for example between the slots 355, and removably receives an end of the PCB 345. The end of the PCB 345 that is received at the slot 365 includes an electrical connection 370 to the RF components of matching circuit 310, the electrical connection 370 electrically connecting the matching circuit 310 to the electrical connector 305 and/or the signal pin 320. As shown, sides of the PCB 345 slide into the slots 355 of the receptacle 350, which may include metal contacts that are electrically connected to the base 300 and/or the shell 315.

The connector assembly 230 also includes an insulating spacer 375, which is received in an aperture 380 formed in the base 300 (for example, at an internal side of the base 300). The spacer 375 includes a respective aperture 385 into which the signal pin 320 is received such that the electrical connector 305 and the signal pin 320 are electrically isolated from the base 300. When the antenna 105 is attached to the device 100, the electrical connector 305 is electrically connected to the radio transceiver 115 and the base 300 is grounded.

The matching circuit 310 also includes a respective signal pin 390 extending towards the antenna conductor 210 (for example, when the antenna 105 is assembled). As shown, the signal pin 390 extends from the PCB 345 at an end opposite of the end where the electrical connection 370 is located and/or where the PCB 345 is received in the slots 355 of the receptacle 350. A head of the signal pin 390 includes opposing biased portions, which may be compressed towards each other to mate with an electrically conducting receptacle that receives the respective signal pin 390. This electrically conducting receptacle is configured to removably receive the signal pin 390, and is electrically connected to the antenna conductor 210, such that the signal pin 390 and the antenna conductor 210 are electrically connected via electrically conducting receptacle.

The connector assembly 230 also includes a dielectric component 391 configured to removably mate with, and/or removably attach to, the shell 315. For example, the dielectric component 391 mates with the shell 315 via threads 392 located at a shell end of the dielectric component 391. The threads 392 removably mate with complementary threads (not visible in FIG. 3) at an internal surface of the shell 315.

As described above, the dielectric component 391 also includes an electrically conducting receptacle formed therein (not visible in FIG. 3) that is configured to removably mate with, and electrically connect to, the matching circuit 310 via the signal pin 390. In addition, the matching circuit 310 and the antenna conductor 210 are electrically connected via the electrically conducting receptacle internal to the dielectric component 391. For example, the dielectric component 391 includes an electrical contact 393 at an external surface 394 such that the matching circuit 310 and the antenna conductor 210 are electrically connected via the electrically conducting receptacle and the electrical contact 393. The signal pin 390 connects to the electrically conducting receptacle internal to the dielectric component 391 (for example via an aperture 395 in the dielectric component 391 at the end which attaches to the shell 315), which is electrically connected to the electrical contact 393 connected to an end of the antenna conductor 210.

The dielectric component 391 additionally acts as a partially flexible mechanical interface between the rigid shell 315 and the antenna conductor 210 and flexible support 215. For example, as shown in FIG. 3, the dielectric component 391 further includes, at an antenna end, opposite a shell end of the dielectric component 391, a mechanical connector 396 that mates with and supports the flexible support 215.

Figure 4:
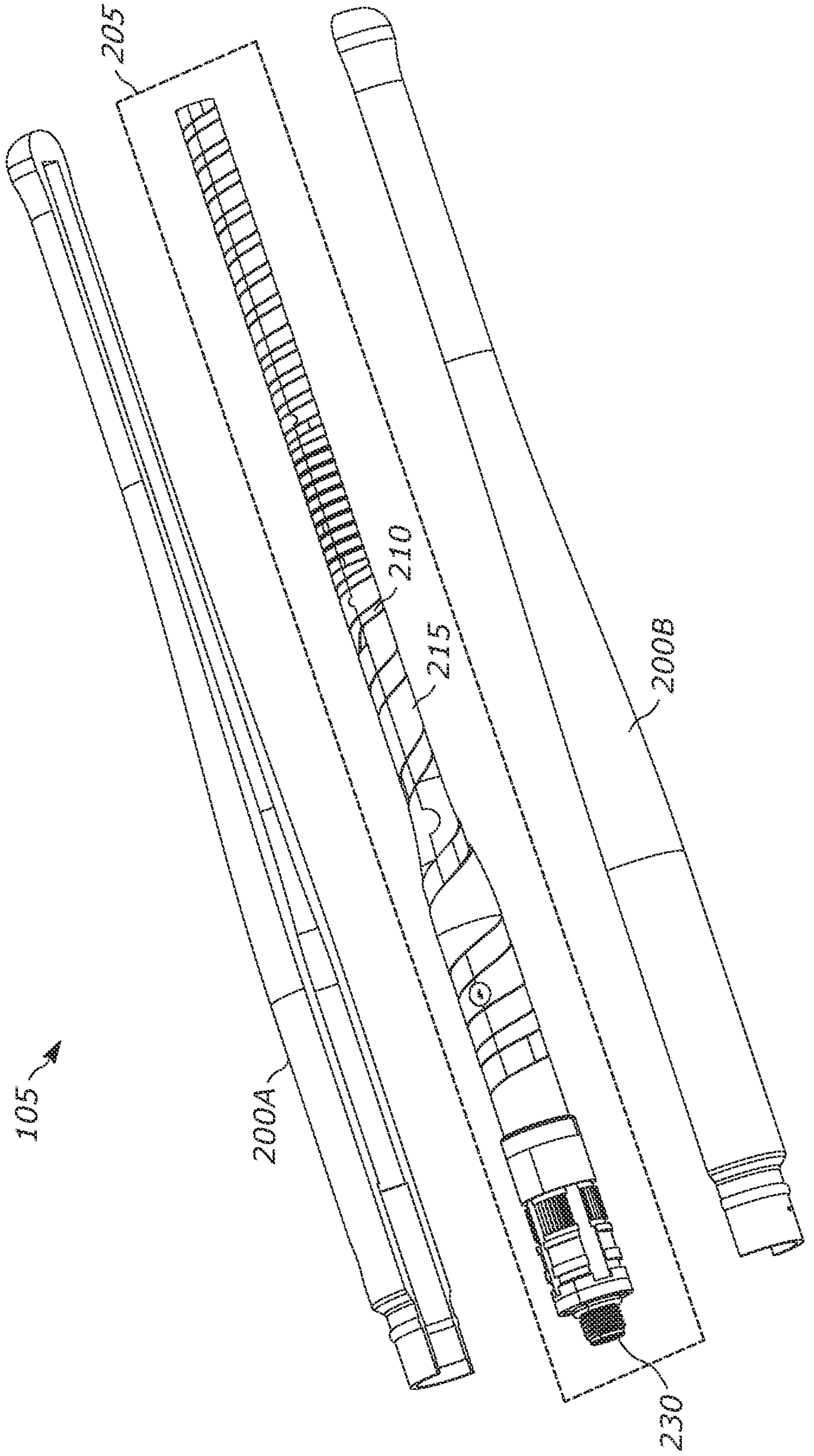
FIG. 4 is an exploded view of an antenna included in the portable communication device of FIG. 1 in accordance with some aspects.

FIG. 4 illustrates an exploded view of the antenna 105 in which the antenna core 205 is assembled. That is, FIG. 4 illustrates an exploded view of the antenna 105 in which the antenna conductor 210 and the flexible support 215 are coupled to the connector assembly 230 (for example, by the mechanical connector 396) to form the antenna core 205. Furthermore, although not shown in FIG. 4, for instances in which the antenna 105 includes a floating antenna element, the floating antenna element 220 is inserted in the flexible support 215 when the antenna core 205 is assembled.

Before the first and second halves 200A, 200B of the external sheath 200 are compression molded around the assembled antenna core 205, a layer of an adhesive bonding material is coated on the antenna core 205. The bonding material is used to bond the antenna core 205 to the external sheath 200 when the first and second halves 200A, 200B are compression molded around the antenna core 205. In some instances, the bonding material is coated on the antenna core 205 at a particular temperature, or within a particular temperature range, before the first and second halves 200A, 200B of the external sheath 200 are compression molded around the antenna core 205. In some instances, the bonding material is a room temperature cure adhesive material.

In some instances, the entire exterior of the antenna core 205 (for example, the antenna conductor 210, the flexible support 215, and the connector assembly 230) is coated with the same bonding material. In other instances, the antenna conductor 210 and the flexible support 215 are coated with a first bonding material and the connector assembly 230 is coated with a second bonding material, different than the first bonding material, before the first and second halves 200A, 200B of the external sheath are compression molded around the antenna core 205. In such instances, the first bonding material is chosen to be a bonding material that is best suited for bonding the antenna conductor 210 and/or the flexible support 215 to the external sheath 200 and the second bonding material is chosen to be a bonding material that is best suited for bonding the metal shell 315 of the connector assembly 230 to the external sheath 200.

In some instances, the first bonding material that is coated on the antenna conductor 210 and/or the flexible support 215 is a room temperature vulcanizing (RTV) silicone. RTV silicone is best suited for bonding the flexible support 215, which as described above may be formed of one or more of polyamide, liquid silicone rubber, and/or glass-filled nylon, to the silicone rubber external sheath 200. When compared to other bonding and/or adhesive materials, for example epoxy, RTV silicone is the most effective in bonding the antenna conductor 210 and/or the flexible support 215 to the silicone rubber external sheath 200 when the first and second halves 200A, 200B of the external sheath are compression molded around the antenna core 205. One non-limiting example of a particular RTV silicone used to bond the antenna conductor 210 and/or the flexible support 215 to the external sheath 200 is 3145 RTV manufactured by DOWSIL™.

In some instances, the second bonding material that is coated on the metal shell 315 of the connector assembly 230 is a material that is different that RTV silicone. For example, the second bonding material may be one or more of DOWSIL™ 92-023, DOWSIL™ 3-1598, and/or DOWSIL™ 2-4207, which are more effective in bonding the metal shell 315 to the silicone rubber external sheath 200 than the RTV silicone. In other instances, RTV silicone is also used to bond the connector assembly 230 to the silicone rubber external sheath 200. That is, in other instances, the metal shell 315 is coated with the RTV silicone used to coat the antenna conductor 210 and/or the flexible support 215 before the first and second halves 200A, 200B of the external sheath 200 are compression molded around the antenna core.

Figure 5:
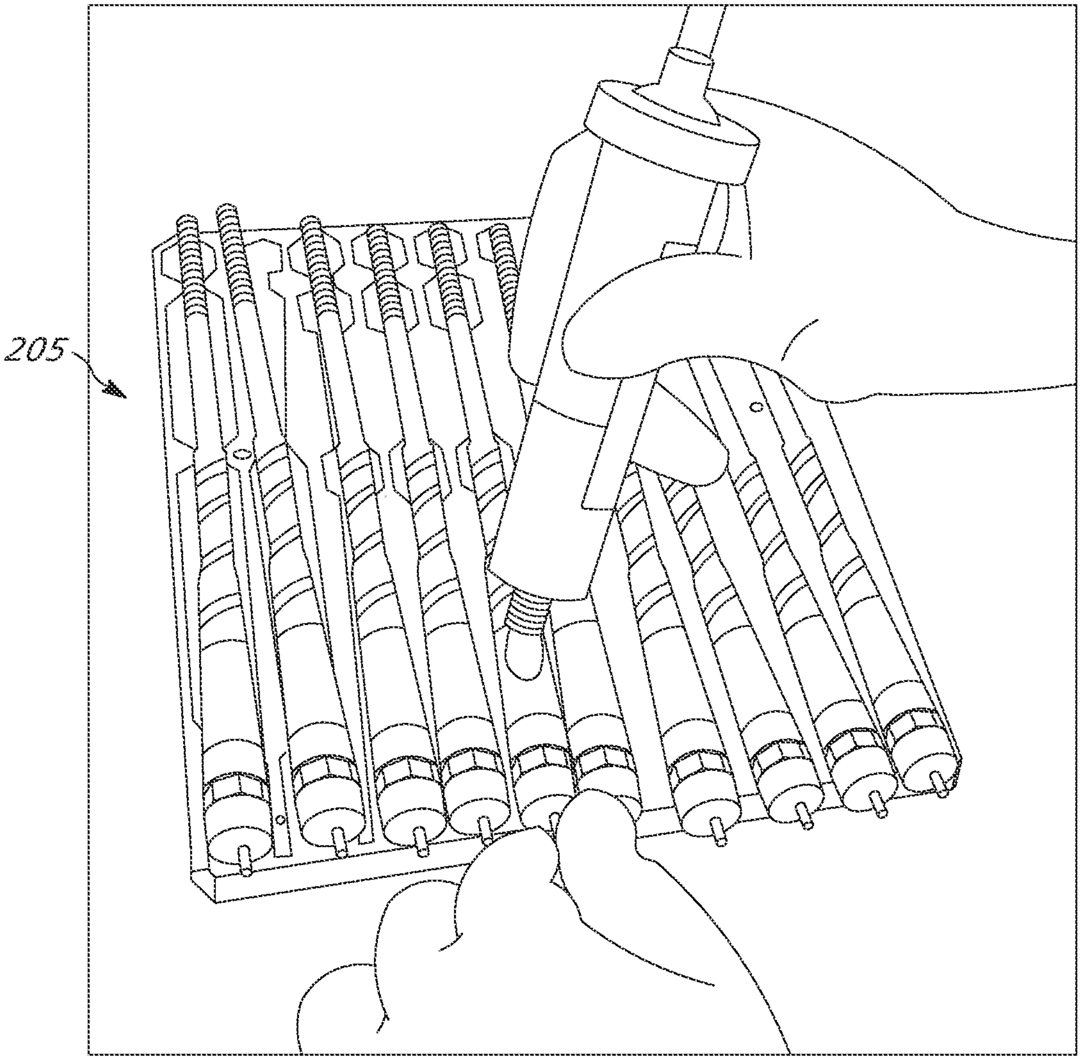
FIG. 5 illustrates the dispensing of a bonding material on a core of the antenna of FIG. 4 in accordance with some aspects.
Figure 6:
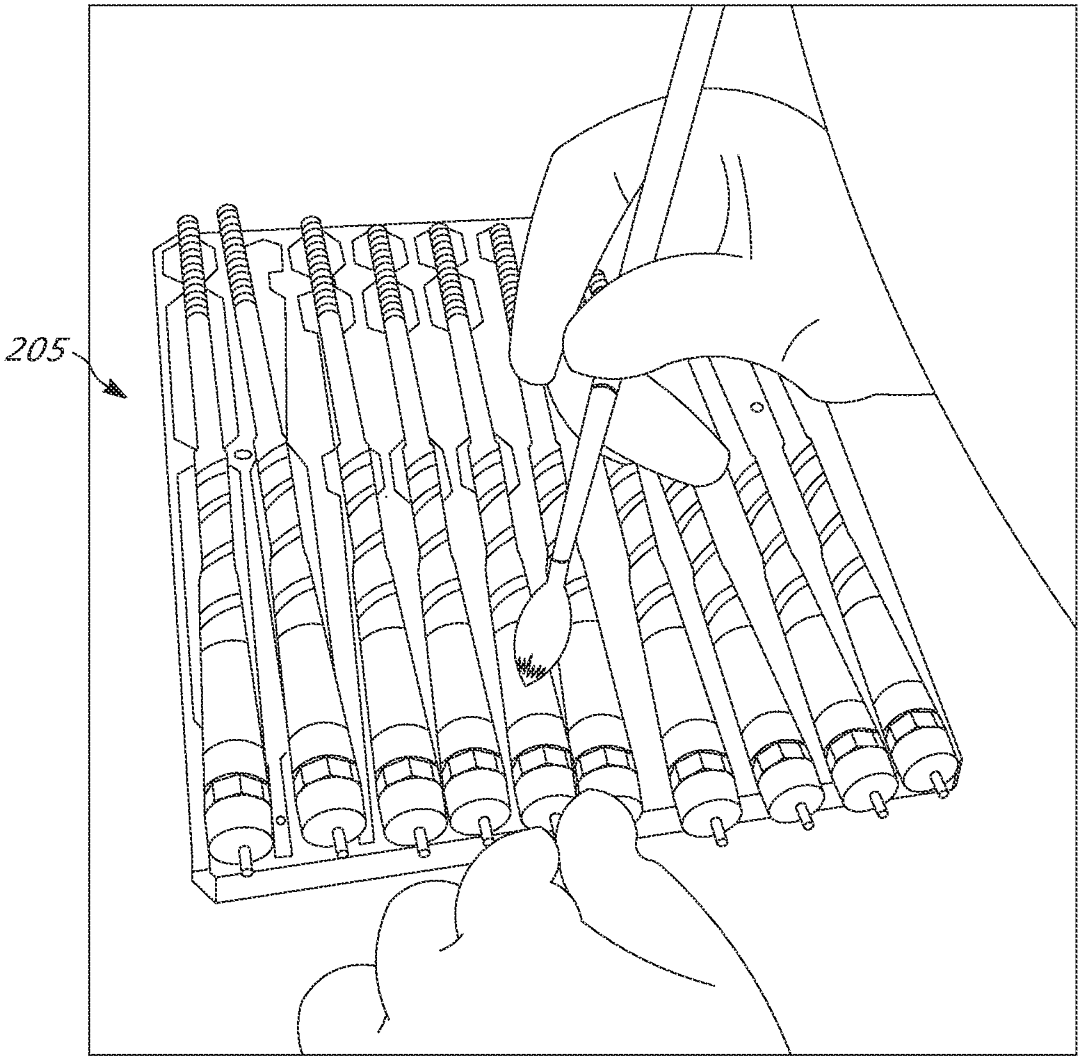
FIG. 6 illustrates coating a core of the antenna of FIG. 4 with a bonding material in accordance with some aspects.

FIG. 5 illustrates an example in which RTV silicone is dispensed over a plurality of assembled antenna cores 205. FIG. 6 illustrates coating, via a brush, the assembled antenna cores 205 with the dispensed RTV silicone. Although illustrated as being manually dispensed and spread across the assembled antenna cores 205, it should be understood that other methods for coating an assembled antenna core 205 with RTV silicone may be used. For example, in some instances, an assembled antenna core 205 is dipped in the RTV silicone. In some instances, the RTV silicone is sprayed on an assembled antenna core 205. In other instances, the RTV silicone is coated on an assembled antenna core 205 by a machine.

After the bonding material(s) are coated on the antenna core 205, the first and second halves 200A, 200B of the silicone rubber external sheath 200 are compression molded around the antenna core 205. In some instances, approximately 120 kilograms per cubic centimeter (kgcm$^3$) of compressive force is applied to compression mold the first and second halves 200A, 200B of the external sheath 200 around the antenna core 205. In some instances, a compressive force within the range of 100-140 kgcm$^3$ is applied to compression mold the first and second halves 200A, 200B of the external sheath 200 around the antenna core 205. In some instances, the first and second halves 200A, 200B of the external sheath 200 are compression molded around the antenna core 205 at a temperature of approximately 110° Celsius. In some instances, the first and second halves 200A, 200B of the external sheath 200 are compression molded around the antenna core 205 at a temperature within the range of 95-125° Celsius.

During compression molding of the first and second halves 200A, 200B of the external sheath 200 around the antenna core 205, the components of the of the antenna core 205 become bonded to the external sheath 200 by the respective bonding material(s). For example, in instances in which the antenna conductor 210 and the flexible support 215 are coated with a first bonding material (for example, RTV silicone), the first bonding material bonds the antenna conductor 210 and the flexible support 215 to the silicone rubber external sheath 200 during compression molding of the first and second halves 200A, 200B. Similarly, in instances in which the connector assembly 230 is coated with a second bonding material (for example, one or more of DOWSIL™ 92-023, DOWSIL™ 3-1598, and/or DOWSIL™ 2-4207), different than the first bonding material, the second bonding material bonds the connector assembly 230 to the silicone rubber external sheath 200 during compression molding of the first and second halves 200A. 200B. In instances in which the entire antenna core 205 is coated with the same bonding material (for example, RTV silicone), the bonding material bonds the antenna conductor 210, the flexible support 215, and the connector assembly 230 to the silicone rubber external sheath 200 during compression molding of the first and second halves 200A, 200B.

After the first and second halves 200A, 200B of the external sheath 200 are compression molded around the antenna core 205, the RTV silicone is cured at room temperature (for example, approximately 25° Celsius) for 3-7 days. In some instances, the RTV silicone layer is cured at any temperature lying within the range of 20-80° Celsius (without or without humidity during curing) after the first and second halves 200A, 200B of the external sheath 200 are compression molded around the antenna core 205. For instances in which the connector assembly 230 is coated with a second bonding material that is different than RTV silicone, the second bonding material may be cured for a different amount of a time and/or at different temperatures. For example, if DOWSIL™ 92-023 is used to bond the connector assembly 230 to the external sheath 205, the DOWSIL™ 92-023 may be cured at approximately 60° Celsius for approximately 30 minutes after the first and second halves 200A, 200B of the external sheath 200 are compression molded around the antenna core 205. As another example, if DOWSIL™ 3-1598 is used to bond the connector assembly 230 to the external sheath 205, the DOWSIL™ 3-1598 may be cured at approximately 100-150° Celsius for approximately 15-180 minutes (for example, at 100° Celsius for 180 minutes, at 125° Celsius for 30 minutes, and/or at 150° Celsius for 15 minutes) after the first and second halves 200A, 200B of the external sheath 200 are compression molded around the antenna core 205. As another example, if DOWSIL™2-4207 is used to bond the connector assembly 230 to the external sheath 205, the DOWSIL™ 2-4207 may be cured at approximately 50-100° Celsius for approximately 3-10 minutes (for example, at 50° Celsius for 10 minutes and at 100° Celsius for 3 minutes) after the first and second halves 200A, 200B of the external sheath 200 are compression molded around the antenna core 205.

Figure 7:
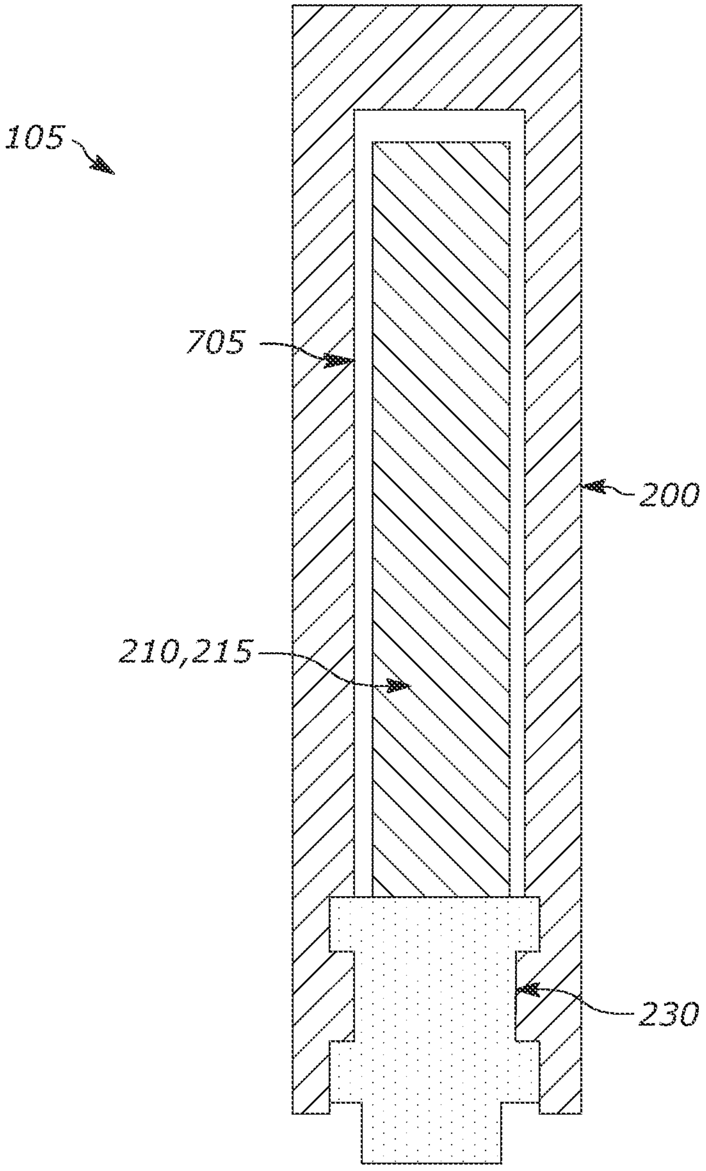
FIG. 7 is a block diagram of an antenna included in the portable communication device of FIG. 1 in accordance with some aspects.
Figure 8:
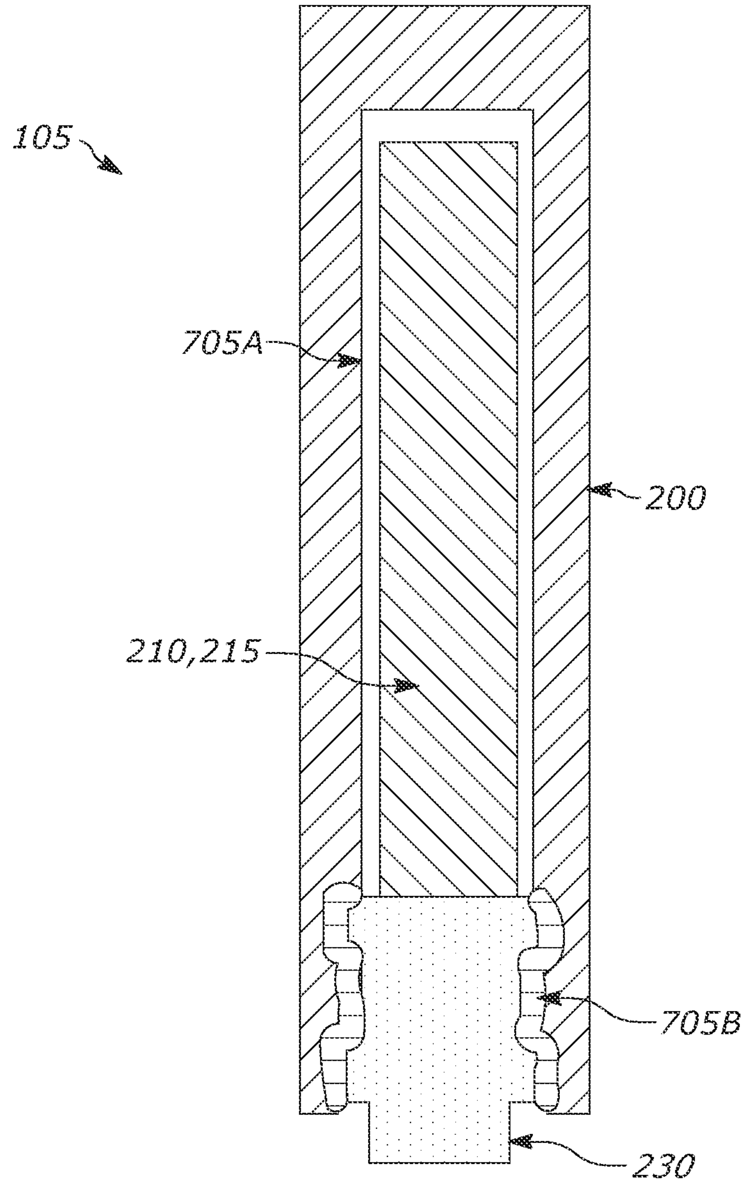
FIG. 8 is a block diagram of an antenna included in the portable communication device of FIG. 1 in accordance with some aspects.

Construction of the antenna 105 is completed after the first and second halves 200A, 200B are compression molded into a single external sheath 200 that surrounds the antenna core 205. FIG. 7 illustrates a block diagram of the antenna 105 after the external sheath 200 has been compression molded around the antenna core 205. As shown, a layer 705 of the bonding material is disposed between the antenna core 205 and the external sheath 200. In some instances, the layer 705 of bonding material includes a single bonding material that bonds the antenna core 205 to the external sheath. In some instances, the layer 705 of bonding material includes a first bonding material layer (for example, RTV silicone) that bonds a first portion of the antenna core 205 (for example, the antenna conductor 210 and the flexible support 215) to the external sheath 200 and a second bonding material layer that bonds a second portion of the antenna core 205 (for example, the connector assembly 230) to the external sheath 200. FIG. 8 illustrates a block diagram of the antenna 105 in which a first layer 705A of RTV silicone is coated on the antenna conductor 210 and the flexible support 215 and a second layer 705B of a second bonding material is coated on the connector assembly 230.

In some instances, the external sheath 200 is not formed by compression molding first and second halves 200A, 200B around the antenna core 205. For example, in some instances, the external sheath 200 is a single piece that is fitted on the antenna core 205, for example by sliding the external sheath 200 onto the antenna core 205, during construction of the antenna 105. In such instances, the single piece external sheath 200 is still bonded to the antenna core 205 using a bonding material, such as RTV silicone. For example, the antenna core 205 may be coated with the RTV silicone before the external sheath 200 is slid onto, or otherwise fitted on, the antenna core 205 to surround the antenna core 205.

Compared to existing antenna designs that do not include an underfill layer of bonding material disposed between an antenna core and an external sheath, the antenna 105 described herein is more durable and resistant to damage caused by physical stresses exerted on the antenna 105. In addition, when compared to existing antenna designs that include an external sheath formed of a rigid material (for example, thermoplastic), the silicone rubber external sheath 200 of the antenna 105 described herein is more flexible while under load. Accordingly, due to the materials and methods used to construct the antenna 105 described herein, the antenna 105 is better suited to pass safety and reliability requirements for portable communication devices and antennas established by the NFPA.

For example, existing antenna designs often include a rigid thermoplastic external sheath that is either injection molded and fitted onto the antenna core or a rigid thermoplastic sheath that is over molded onto the antenna core. However, existing antennas does not include an underfill layer that bonds the external sheath to the antenna core. As a result, the antenna core is not bonded to the thermoplastic sheath and an air gap forms between the thermoplastic sheath and the antenna core. When an air gap exists between the antenna core and the external sheath, the antenna core is free to move around within and independently of the thermoplastic sheath. For example, the antenna core of an existing antenna design may be free to move around within the external sheath during the stress tests, for example the drop test and the tumble test, required by the NFPA. Such movement of the antenna core within the external sheath during operation of the device may lead to damage to one or more components of the antenna core.

In contrast, the antenna 105 described herein, in which the antenna core 205 is bonded to the external sheath 200, passes each of the stress tests required by the NFPA. For example, when the antenna 105 is coupled to the device 100, the antenna 105 passes each of the drop test, the tumble test, the heat and immersion test, the direct flame test, and the convection heat test required by the NFPA. The drop test includes repeatedly dropping the device 100 from a height of 3 meters (m) such that the device 100 lands on various sides of the device 100 and/or at various angles. In addition, the drop test is performed at temperatures of −10° Fahrenheit, 70° Fahrenheit, and 160° Fahrenheit. The tumble test includes tumbling the device 100 in a drum rotating at a rate of 15 rotations per minute (rpm) for 3 hours. Due to the flexibility and strength of the materials used to form and bond the external sheath 200 and the antenna core 205, the antenna 105 does not break during the drop test or tumble test. That is, the resiliency and heat resistance properties of the conductive material(s) used to form the antenna conductor 210, the polyamide, liquid silicone rubber, and/or glass-filled nylon used to form the flexible support 215, and the silicone rubber used to form the external sheath 200 allow the antenna 105 to endure the physical stresses of the drop and tumble tests without breaking.

The heat and immersion test includes subjecting the device 100 to temperatures of at least 350° Fahrenheit for 15 minutes. The heat and immersion test also includes submerging the device 100 in water at a depth of approximately 22 feet for 15 minutes. The direct flame test includes directly exposing the device 100 to a flame at temperatures between 1500-2100° Fahrenheit for at least 10 seconds. The convection heat test includes placing the device 100 in a convection oven heated to 500° Fahrenheit for at least 5 minutes. As described above, the antenna 105 is capable of passing each of these heat and/or immersion tests because the materials selected to construct and bond the external sheath 200 and the antenna core 205 are rated withstand the high temperatures of the NFPA stress tests. For example, each of the conductive material(s) used to form the antenna conductor 210, the polyamide, liquid silicone rubber, and/or glass-filled nylon used to form the flexible support 215, and the silicone rubber used to form the external sheath 200 are rated to withstand submersion in water and exposure to temperatures of at least 350° Fahrenheit for greater than 15 minutes, direct exposure to a flame of 1500-2100° Fahrenheit for greater than 10 seconds, and exposure to 500° Fahrenheit of convection heat for at least 5 minutes.

Figure 9:
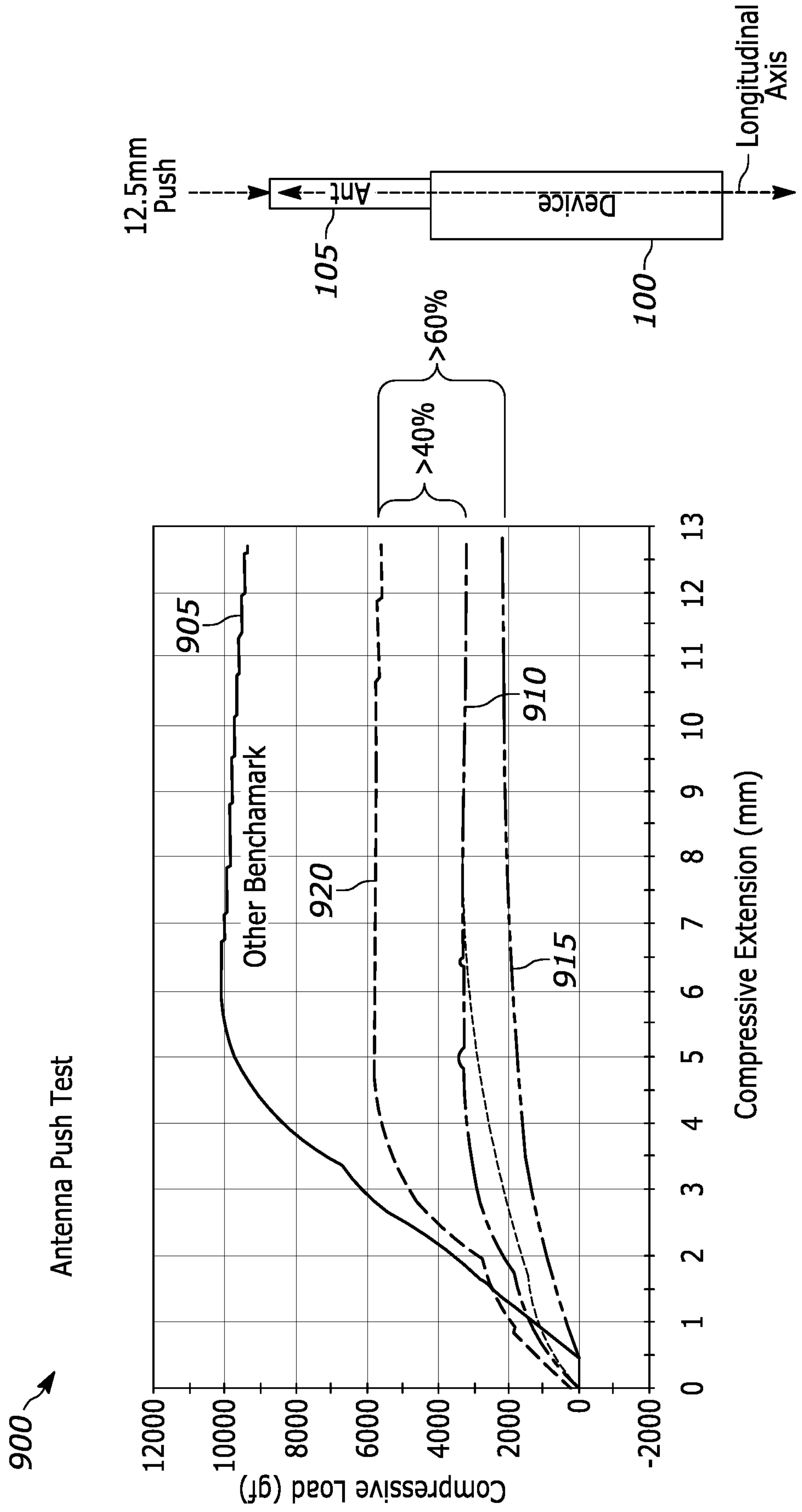
FIG. 9 is a graph displaying the results of a first flexibility test used on various external antennas in accordance with some aspects.
Figure 10:
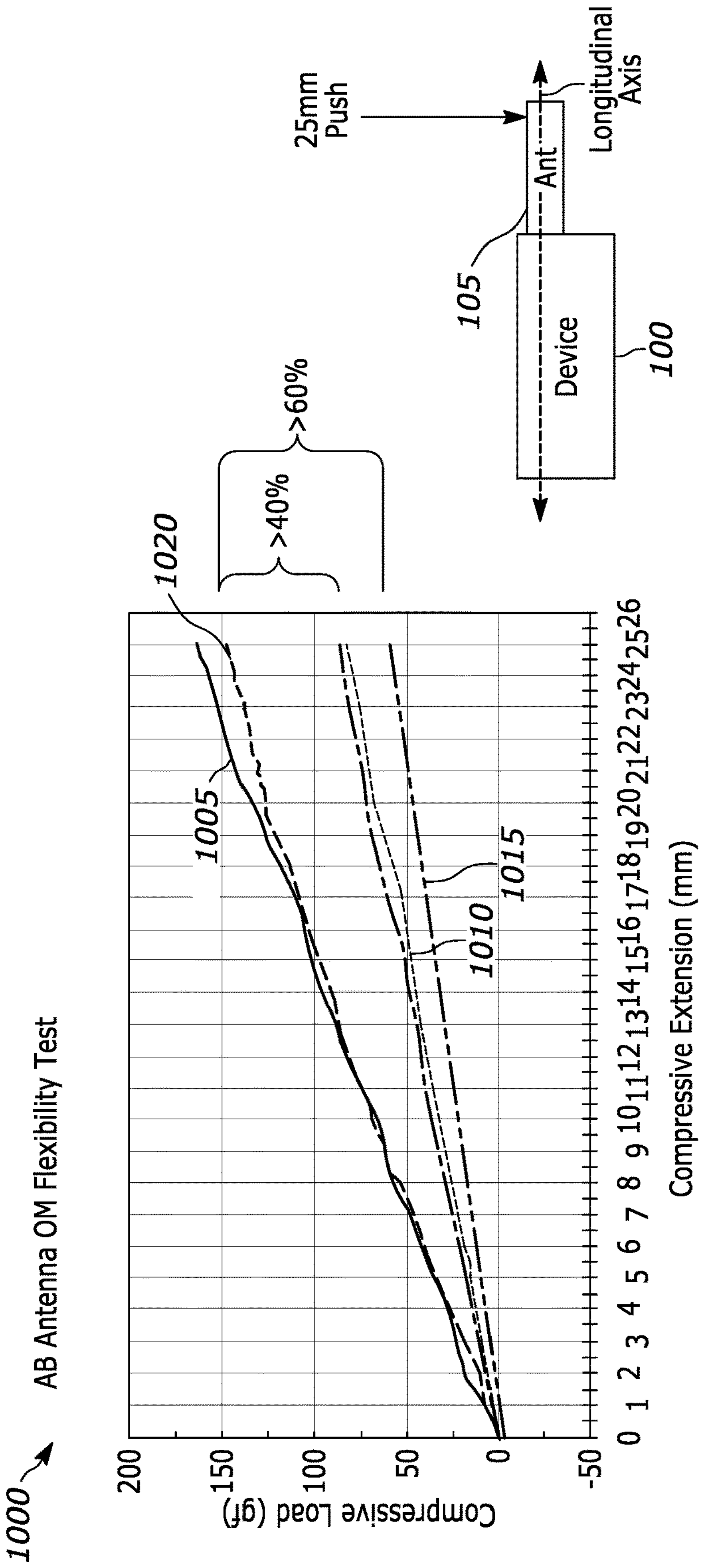
FIG. 10 is a graph displaying the results of a second flexibility test used on various external antennas in accordance with some aspects.

In addition, as described above, the silicone rubber material used to form the external sheath 200 of the antenna 105 results in an antenna that is more flexible than existing antenna designs that include a rigid thermoplastic external sheath. FIGS. 9 and 10 are graphs that display the results of respective flexibility tests used to measure and compare the flexibility of the antenna 105, an existing antenna design, and a flexibility performance benchmark.

In particular, FIG. 9 is a graph 900 that displays the results of a first flexibility test used to measure the flexibility of the antenna 105 and an existing antenna design. With respect to the block diagram of the device 100 shown in FIG. 9, the first test includes applying a compressive force on a distal end of the antenna 105 in the direction of the body of device 100. In other words, the first test includes "pushing" on the distal end of the antenna 105 in a direction along the longitudinal axis of the antenna 105 and towards the body of the device 100.

The graph 900 includes a first curve 905, a second curve 910, a third curve 915, and a fourth curve 920. The first curve 905 displays a performance benchmark for compressive extension of an antenna during the first flexibility test. The second curve 910 displays a first example relationship between the amount of compressive force applied to the antenna 105 and the corresponding amount of compressive extension experienced by the antenna 105. As shown by the second curve 910, the antenna 105 is compressed by 12.5 millimeters (mm) when a compressive force of approximately 3500 gram-force (gf) is exerted on the distal end of the antenna 105 in a direction along the longitudinal axis of the antenna 105 and towards the body of the device 100. The third curve 915 displays a second example relationship between the amount of compressive force applied to the antenna 105 and the corresponding amount of compressive extension experienced by the antenna 105. As shown by the third curve 915, the antenna 105 is compressed by 12.5 millimeters (mm) when a compressive force of approximately 2300 gram-force (gf) is exerted on the distal end of the antenna 105 in a direction along the longitudinal axis of the antenna 105 and towards the body of the device 100.

In contrast, as shown by the fourth curve 920, the existing antenna is only compressed by approximately 2.2 mm when a compressive force of 3500 gf is exerted on the distal end of the existing antenna along the longitudinal axis of the existing antenna in a direction towards the body of the device to which the existing antenna is connected. Moreover, as shown by the fourth curve 920, the existing antenna is only compressed by approximately 1.2 mm when a compressive force of 2300 gf is exerted on the distal end of the existing antenna along the longitudinal axis of the existing antenna in a direction towards the body of the device to which the existing antenna is connected. As further shown by the fourth curve 920, a compressive force of approximately 6000 gf is needed to compress the existing antenna by 12.5 mm in a direction towards the body of the device to which the existing antenna is connected.

Accordingly, by comparing the second and third curves 910, 915 to the fourth curve 920, it can be determined that at least 40% less force, and as much as 60% less force, is required to compress the antenna 105 by 12.5 mm than is required to compress the existing antenna by 12.5 mm. In other words, the antenna 105 is at least 40-60% more flexible than the existing antenna with respect to compression along the respective longitudinal axes of the antenna 105 and the existing antenna.

In some instances, the antenna 105 is compressed by at least 10 mm along its longitudinal axis in a direction towards the body of the device 100 when a compressive force less than 4000 gf is exerted on the distal end of the antenna 105 in a direction along the longitudinal axis of the antenna 105 and towards the body of the device 100. In some instances, the antenna 105 is compressed by at least 10 mm along its longitudinal axis in a direction towards the body of the device 100 when a compressive force less than 3600 gf is exerted on the distal end of the antenna 105 in a direction along the longitudinal axis of the antenna 105 and towards the body of the device 100. In some instances, the antenna 105 is compressed by at least 10 mm along its longitudinal axis in a direction towards the body of the device 100 when a compressive force less than 2500 gf is exerted on the distal end of the antenna 105 in a direction along the longitudinal axis of the antenna 105 and towards the body of the device 100. In some instances, the antenna 105 is compressed by at least 10 mm along its longitudinal axis in a direction towards the body of the device 100 when a compressive force between 3500 and 4000 gf is exerted on the distal end of the antenna 105 in a direction along the longitudinal axis of the antenna 105 and towards the body of the device 100. In some instances, the antenna 105 is compressed by at least 10 mm along its longitudinal axis in a direction towards the body of the device 100 when a compressive force between 2300 and 4000 gf is exerted on the distal end of the antenna 105 in a direction along the longitudinal axis of the antenna 105 and towards the body of the device 100.

FIG. 10 is a graph 1000 that displays the results of a second flexibility test used to measure the flexibility of the antenna 105 and an existing antenna design. With respect to the block diagram of the device 100 shown in FIG. 10, the second test includes applying a linear force on a distal end of the antenna 105 in a direction that is perpendicular to the longitudinal axis of the antenna 105. In other words, the second test includes "pushing" on the distal end of the antenna 105 in a direction that is perpendicular to the longitudinal axis of the antenna 105, thereby displacing the distal end of the antenna 105 from the longitudinal axis of the antenna 105.

The graph 1000 includes a first curve 1005, a second curve 1010, a third curve 1015, and a fourth curve 1020. The first curve 1005 displays a performance benchmark for compressive extension of an antenna during the second flexibility test. The second curve 1010 displays a first example relationship between the amount of force applied to the distal end of the antenna 105 in a direction that is perpendicular to the longitudinal axis of the antenna 105 and the corresponding displacement of the distal end of the antenna 105 from the longitudinal axis of the antenna 105. As shown by the second curve 1010, the distal end of the antenna 105 is displaced from the longitudinal axis of the antenna 105 by 25 mm when a force of approximately 80 gf is exerted on the distal end of the antenna 105 in a direction perpendicular to the longitudinal axis of the antenna 105. The third curve 1015 displays a second example relationship between the amount of force applied to the distal end of the antenna 105 in a direction that is perpendicular to the longitudinal axis of the antenna 105 and the corresponding displacement of the distal end of the antenna 105 from the longitudinal axis of the antenna 105. As shown by the third curve 1015, the distal end of the antenna 105 is displaced from the longitudinal axis of the antenna 105 by 25 mm when a force of approximately 60 gf is exerted on the distal end of the antenna 105 in a direction perpendicular to the longitudinal axis of the antenna 105.

In contrast, as shown by the fourth curve 1020, the distal end of the existing antenna is only displaced from the longitudinal axis of the existing antenna by approximately 12.5 mm when a force of 80 gf is exerted on the distal end of the existing antenna in a direction that is perpendicular to the longitudinal axis of the existing antenna. Moreover, as shown by the fourth curve 1020, the distal end of the existing antenna is only displaced from the longitudinal axis of the existing antenna by approximately 8 mm when a force of 60 gf is exerted on the distal end of the existing antenna in a direction that is perpendicular to the longitudinal axis of the existing antenna. As further shown by the fourth curve 1020, a compressive force of approximately 150 gf is needed to displace the distal end of the existing antenna from the longitudinal axis of the existing antenna by 25 mm. Accordingly, by comparing the second and third curves 1010, 1015 to the fourth curve 1020, it can be determined that at least 40% less force, and as much as 60% less force, is required to displace the distal end of the antenna 105 from the longitudinal axis of the antenna 105 by 25 mm than is required to displace distal end of the existing antenna from the longitudinal axis of the existing antenna by 25 mm. In other words, the antenna 105 is at least 40-60% more flexible than the existing antenna when the antenna 105 is displaced, or bent away, from its longitudinal axis.

In some instances, the distal end of the antenna 105 is displaced from the longitudinal axis of the antenna 105 by at least 20 mm when a force less than 100 gf is exerted on the distal end of the antenna 105 in a direction perpendicular to the longitudinal axis of the antenna 105. In some instances, the distal end of the antenna 105 is displaced from the longitudinal axis of the antenna 105 by at least 20 mm when a force less than 70 gf is exerted on the distal end of the antenna 105 in a direction perpendicular to the longitudinal axis of the antenna 105. In some instances, the distal end of the antenna 105 is displaced from the longitudinal axis of the antenna 105 by at least 20 mm when a force between 70-100 gf is exerted on the distal end of the antenna 105 in a direction perpendicular to the longitudinal axis of the antenna 105. In some instances, the distal end of the antenna 105 is displaced from the longitudinal axis of the antenna 105 by at least 20 mm when a force between 50-100 gf is exerted on the distal end of the antenna 105 in a direction perpendicular to the longitudinal axis of the antenna 105. In some instances, the distal end of the antenna 105 is displaced from the longitudinal axis of the antenna 105 by at least 20 mm when a force less 60-80 gf is exerted on the distal end of the antenna 105 in a direction perpendicular to the longitudinal axis of the antenna 105.

Figure 11:
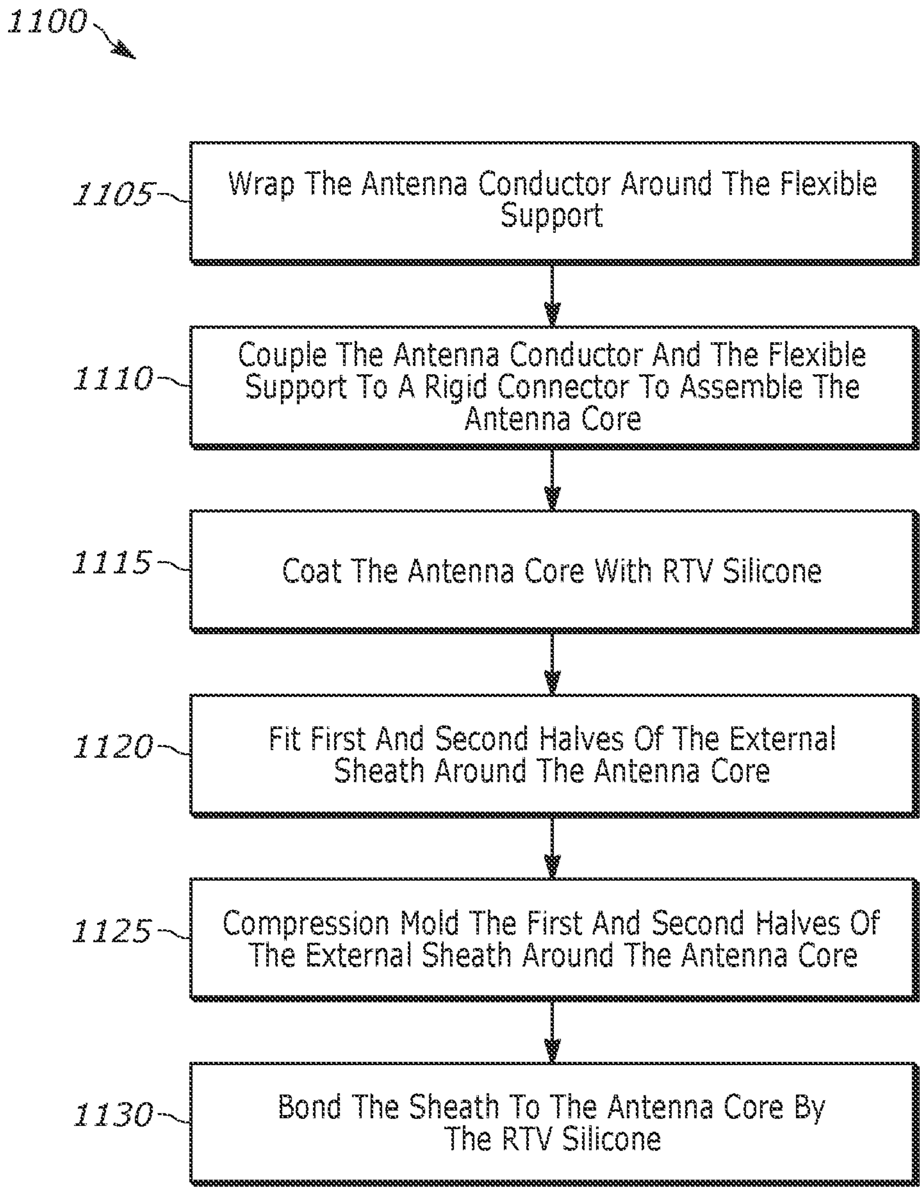
FIG. 11 is a flowchart of an example method for constructing an antenna in accordance with some aspects.

FIG. 11 illustrates a flowchart of an example method 1100 for constructing an antenna, for example the antenna 105, of a portable communication device, for example the device 100. It should be understood that although a particular order of steps is indicated in FIG. 11 as an example, timing and ordering of such steps may vary where appropriate without negating the purpose and advantages of the examples set forth in detail throughout this disclosure. In the example illustrated, the method 1100 begins with wrapping the antenna conductor 210 around the flexible support 215 (block 1105). In some instances, the antenna conductor 210 is not wrapped around the flexible support 215 and is instead coupled to the flexible support 215 in a different manner.

At block 1110, the antenna conductor 210 and the flexible support 215 are coupled to the rigid connector assembly 230 to assemble the antenna core 205 (block 1110). After assembling the antenna core 205, the antenna core 205 is coated with a bonding material, for example RTV silicone (block 1115). At block 1120, the first and second halves 200A, 200B of the external sheath 200 are fitted around the antenna core 205 (block 1120). The first and second halves 200A, 200B of the external sheath 200 are then compression molded around the antenna core 205 (block 1125) and the antenna core 205 is bonded to the external sheath 200 by the bonding material (for example, RTV silicone) (block 1130).

In the foregoing specification, specific examples, features, and aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An antenna for a portable communication device, the antenna comprising:
- an antenna core including:
  - a conductive antenna element coupled to a flexible support; and
  - a rigid connector coupled to the conductive antenna element and the flexible support;
  - a silicone rubber sheath that surrounds the antenna core; and
  - a room temperature vulcanizing (RTV) silicone layer positioned between the antenna core and the sheath, the RTV silicone layer bonding the antenna core to the sheath.

2. The antenna of claim 1, wherein the flexible support comprises at least one selected from the group consisting of glass-filled nylon, liquid silicone rubber, and polyamide; and
- wherein the at least one selected from the group consisting of glass-filled nylon, liquid silicone rubber, and polyamide is rated to withstand direct exposure to temperatures between 1500-2100° Fahrenheit for at least 10 seconds.

3. The antenna of claim 1, wherein the RTV silicone layer is coated on the conductive antenna element and the flexible support, but not on the rigid connector.

4. The antenna of claim 1, wherein the sheath includes a first half and a second half that are compression molded around the antenna core and the RTV silicone layer.

5. The antenna of claim 1, wherein the conductive antenna element is a helical coil that is wrapped around the flexible support.

6. The antenna of claim 1, wherein the rigid connector includes a metal shell; and wherein the metal shell is coated with a second bonding material that is not RTV silicone.

7. The antenna of claim 1, wherein the silicone rubber sheath is rated to withstand direct exposure to temperatures between 1500-2100° Fahrenheit for at least 10 seconds.

8. The antenna of claim 1, wherein a distal end of the antenna is displaced from a longitudinal axis of the antenna by at least 20 mm when a force less than 100 gram-force is exerted on the distal end of the antenna in a direction perpendicular to the longitudinal axis of the antenna.

9. The antenna of claim 1, wherein the antenna core further includes a floating antenna element that is inserted the flexible support.

* * * * *